United States Patent [19]

Book et al.

[11] Patent Number: 4,568,513

[45] Date of Patent: Feb. 4, 1986

[54] REACTOR POWER PEAKING INFORMATION DISPLAY

[75] Inventors: Theodore L. Book, Lynchburg; Richard A. Kochendarfer, Goode, both of Va.

[73] Assignee: The Babcock & Wilcox Company, New Orleans, La.

[21] Appl. No.: 402,185

[22] Filed: Jul. 26, 1982

[51] Int. Cl.[4] .............................................. G21C 17/00
[52] U.S. Cl. .................................... 376/245; 376/248; 376/258
[58] Field of Search ............... 376/247, 248, 217, 245, 376/242, 236, 258

[56] References Cited

U.S. PATENT DOCUMENTS

| | | | |
|---|---|---|---|
| 3,873,817 | 3/1975 | Liang | 376/245 |
| 3,998,693 | 12/1976 | Musick | 376/217 |
| 4,016,034 | 4/1977 | Musick | 376/236 |
| 4,079,236 | 3/1978 | Graham et al. | 376/245 |
| 4,080,251 | 3/1978 | Musick | 376/242 |

FOREIGN PATENT DOCUMENTS 0100640  2/1984  European Pat. Off. ............ 376/245

Primary Examiner—Salvatore Cangialosi
Attorney, Agent, or Firm—Vytas R. Matas; Robert J. Edwards

[57] ABSTRACT

A system for monitoring and displaying those operating parameters of a nuclear reactor which pertain to the core power distribution is disclosed. An incore system of detectors (24) provides power peaking data to a power peaking margin display system (16) which determines the operational limit line for the reactor core. The positions of the axial power shaping rods and the regulating rods are determined and are shown graphically by means of a cursor on a visual display (18) on which is superimposed the operational limit line determined by the power peaking margin system (16).

4 Claims, 3 Drawing Figures

REACTOR POWER PEAKING INFORMATION DISPLAY

TECHNICAL FIELD

The present invention relates generally to a system for displaying the operating parameters of a nuclear reactor, and more particularly to a display system wherein the margin to the limiting criteria is displayed to the plant operator in a manner which shows the interaction between the various parameters that affect core power distribution.

BACKGROUND ART

The monitoring of the core power level and the power distribution within the core of a nuclear reactor is done to prevent exceeding the applicable limiting criteria relative to heat generation. These power peaking or linear heat rate limits are preserved by monitoring pre-calculated limits for the parameters affecting power distribution (such as regulating rod and axial power shaping rod position), pre-calculated limits for the parameters indicating power distribution (such as axial power imbalance), or by directly measuring the actual peak on a regular basis and comparing it to a pre-calculated peaking limit. Present monitoring systems require collecting the information to be monitored from either several panel meters or a computer printout. This collection of information is sometimes automated to a degree by several computer alarms indicating which parameter is outside the allowable limit. This approach, however, does not provide information relative to the interaction between the various monitored parameters nor does it necessarily make clear the possible remedial actions when the parameter limits are exceeded.

Because of the foregoing, it has become desirable to develop a display system which illustrates the interaction between the various parameters that affect the power distribution within the core and which shows the margin to the limiting operational criteria.

SUMMARY OF THE INVENTION

The present invention solves the aforementioned problems associated with the prior art as well as other problems by integrating data into a form that can be displayed so as to show the status of the core to the plant operator. This is accomplished by utilizing an incore monitoring system to furnish detector signals indicating power peaking data which are converted to relative power densities for subsequent comparison to the limiting criteria. The margin at the present operating conditions is then compared to a base margin for the purpose of adjusting the zero margin line. The present operating conditions and the adjusted zero margin line are then displayed to provide the relative operating margin to the limiting criteria. In this manner the resulting display shows the interaction between the various parameters that affect core power distribution and their effect on the margin to the limiting criteria. In the event of a pending or actual violation of these limiting criteria, this display makes remedial action apparent to the plant operator.

DESCRIPTION OF THE PREFERRED EMBODIMENT

Figure 1:
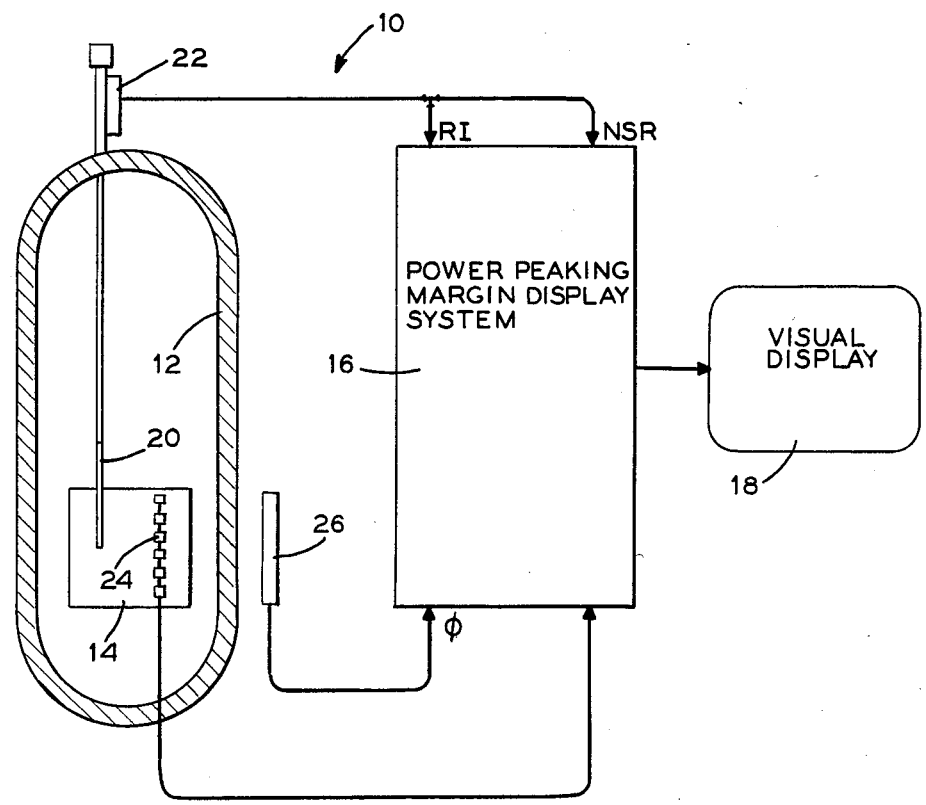
FIG. 1 is a schematic of the overall system used by the present invention.

Referring now to the drawings where the illustrations are for the purpose of describing the preferred embodiment of the present invention and are not intended to limit the invention hereof, FIG. 1 illustrates the overall system 10 used by the present invention. System 10 is comprised of a nuclear reactor vessel 12 having a reactor core 14 contained therein, a power peaking margin display system 16, and a visual display 18. A plurality of control rods 20 is received within the core 14 and regulates the reaction which occurs therein. The position of each control rod 20 is monitored by a position indicator 22 which produce an output indicative of the reactivity regulating rod (RI) and the axial power shaping rod (ASPR) positions, both of which form separate inputs to the power peaking margin display system 16. A string of detectors 24 is provided within the core 14 for monitoring the power conditions therein. The outputs of the detectors 24 are brought out of the core 14, through the pressure boundry, and form an input to the power peaking margin display system 16. An ex-core detector 26 is provided to measure the neutron flux outside the core 14, and the output of the detector 26 forms another input to the power peaking margin display system 16.

Figure 2:
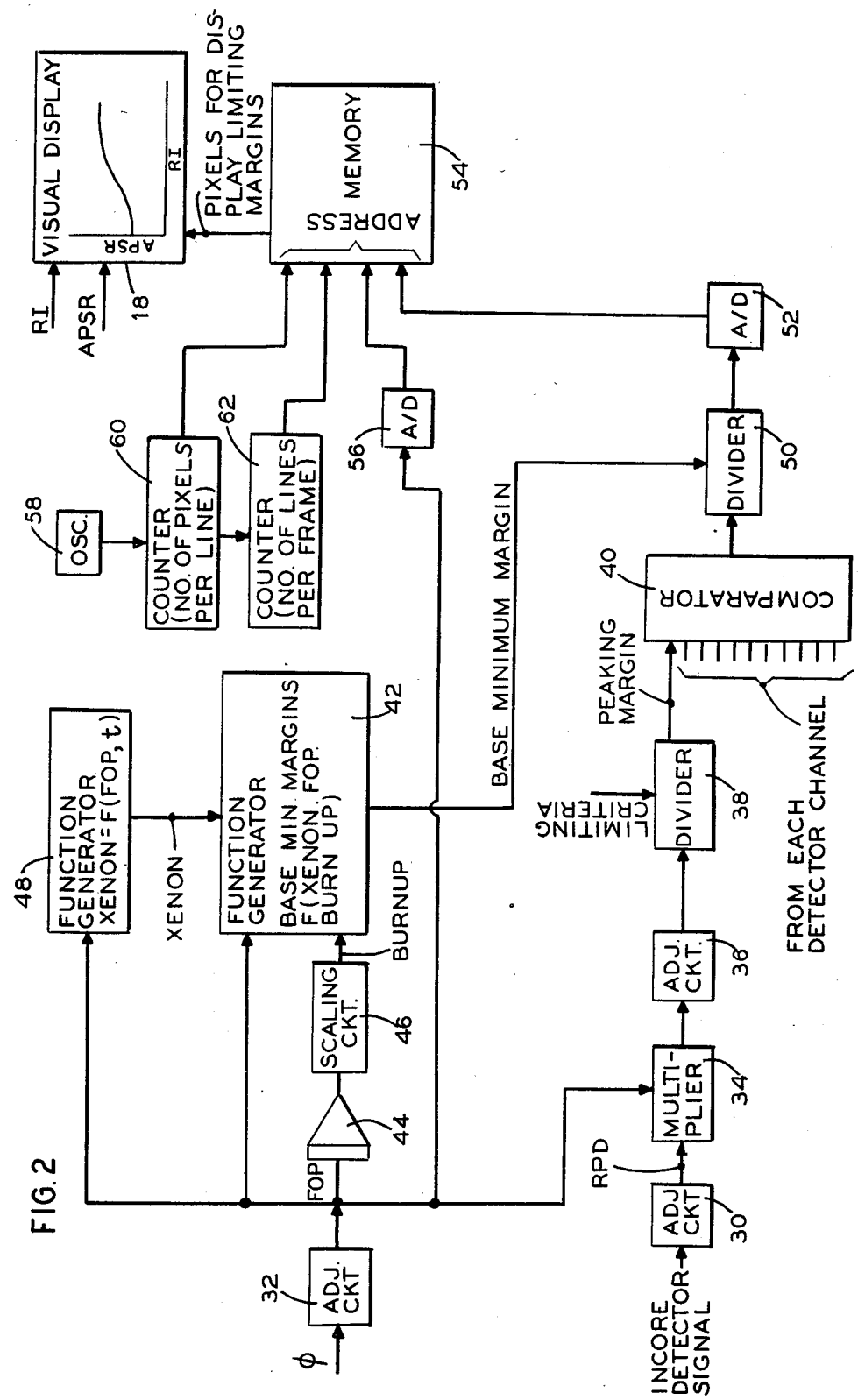
FIG. 2 is an electrical schematic of the circuitry utilized by the power peaking margin display portion of the system of FIG. 1.

Referring now to FIG. 2, the power peaking margin display system 16 is schematically illustrated. The signal produced by each incore detector 24 is adjusted by the factor (Y) by an adjustment circuit 30 to produce a signal representative of the power in the region of that specific detector relative to the power produced in all of the other areas in the reactor core 14. Thus, the output of the adjustment circuit 30 is representative of the relative power density (RPD) within the core 14. While the foregoing is occurring, the signal produced by the ex-core detector 26 is adjusted by an adjustment circuit 32 to produce a signal representative of the fraction of rated power (FOP) that the core 14 is producing. A multiplier 34 is provided for multiplying this latter signal by the signal produced by the adjustment circuit 30, i.e., the signal representative of the relative power density within the core 14, to produce a signal that is indicative of the power peak of the core. This latter signal is adjusted by an adjustment circuit 36 to account for system measurement and observation errors and to produce an adjusted power peak of the core. This adjusted power peak is compared to limiting criteria by a divider 38 which divides the adjusted power peak by the limiting criteria and subtracts the resultant from unity. The resulting output of the divider 38 is called the peaking margin and indicates the relative difference between the adjusted power peak and the limiting criteria. The foregoing is repeated for each of the incore detectors 24 and the resulting peaking margins are compared by a comparator 40 to determine the minimum margin for the core 14.

A base, precalculated minimum margin is determined from measured core conditions by a function generator 42. Inputs to the function generator 42 include the signal representative of the fraction of rated power (FOP)

that the core is producing, the burnup calculated from the fraction of rated power (FOP) by means of an integrator 44 and a scaling circuit 46, and the xenon concentration calculated by another function generator 48 from the time behavior of the fraction of rated power (FOP).

The foregoing minimum margin produced by the comparator 40 is compared to the base, pre-calculated minimum margin by a divider 50 which divides the minimum margin by the base, pre-calculated minimum margin producing an output signal representative of the amount of adjustment required to the limiting peaking margin line because of the differences due to xenon concentration, burnup etc. This output signal, which is in analog form, is converted to digital form by means of an analog to digital converter 52, and the resulting digital signal is used as an address to the limiting line pixel set contained within a memory 54. Another input to the memory 54 is the signal representative of the fraction of rated power (FOP) converted into digital form by means of an analog to digital converter 56. This input is also used to address the limiting line pixel set. The remaining inputs to the memory 54 are generated by an oscillator 58 and a plurality of counters 60, 62, the former counter defining the number of pixels per line while the latter counter defining the number of lines per frame.

The visual display 18 is derived from the pixels defining the limiting margin line and from the reactivity regulating rod (RI) and the axial power shaping rod (ASPR) positions determined by the position indicator 22. The pixels defining the limiting margin line are retrieved from the memory 54 which is addressed by the pixel and line numbers generated by the oscillator 58 and the counters 60, 62, along with the digital signals representative of the fraction of power (FOP) and the required xenon concentration and burnup adjustments. In this manner the resulting margin line is developed by a plurality of interacting operating parameters.

Figure 3:
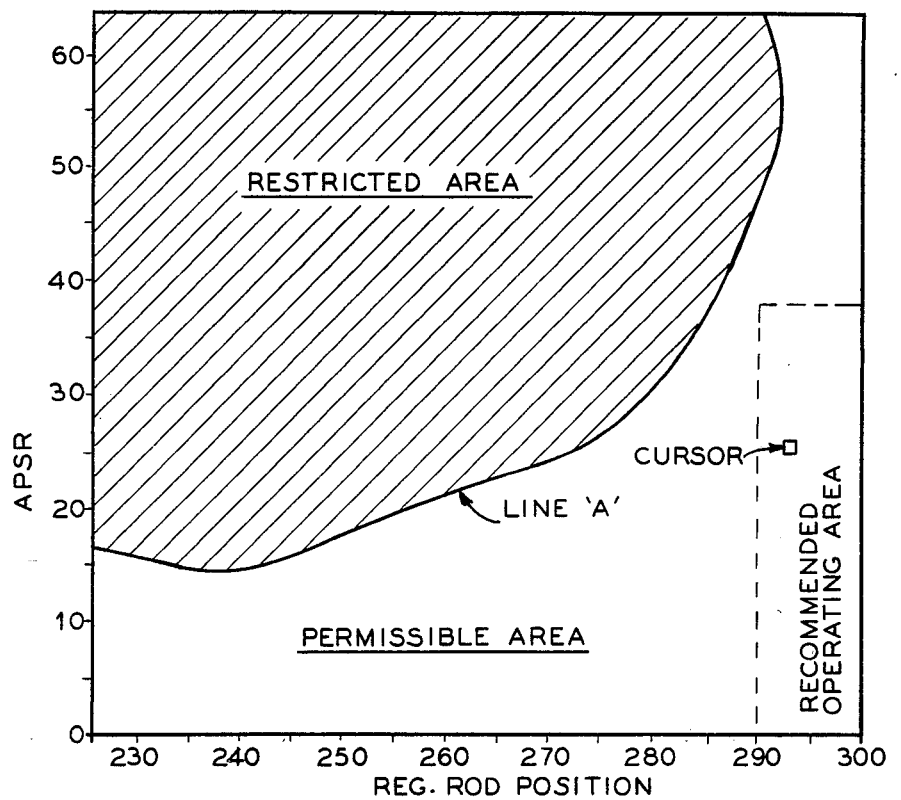
FIG. 3 is a graph of axial power shaping rod position versus regulating rod position showing the limit line with respect to core operating parameters and the resulting areas of permissible core operation.

Referring now to FIG. 3, the graph which is typically shown on the visual display 18 is illustrated. In this graph, the axial power shaping rod position is plotted against the regulating rod position, both of these measurements being obtainable from the position indicator 22. The limiting line is shown as Line "A" and divides the graph into a permissible operating area and a restricted operating area. The permissible operating area is further divided into a recommended operating area. The entire permissible area is available for transient conditions and the recommended operating area is used for steady state conditions. A cursor is utilized to indicate to the plant operator the present operating location of the core on the graph.

From the foregoing, it is apparent that in the event of a core change resulting in the convergence of the limiting line and the cursor, the plant operator can easily see from the display what corrective action must be taken, i.e., he will either move the axial power shaping rods or the regulating rods. The visual display 18 clearly shows which rods must be moved and the direction in which they must be moved in order to direct the cursor back into the permissible operating area. The display eliminates any confusion as to which action must be taken to correct a potential problem.

In addition to immediately alerting the plant operator of a core change requiring corrective action and the action which must be taken, this visual display eliminates the need for separate technical specification requirements for the following parameters inasmuch as they are accounted for in the display:

(a) Regulating Rods versus Power Level;
(b) Operational Imbalance Envelope;
(c) Quadrant Power Tilt; and
(d) Axial Power Shaping Rod versus Power Level.

Thus, the need for the plant operator to consult three separate graphs and to compute the quadrant power tilt has been eliminated by this visual display, and he can respond quickly to any significant core change.

Certain modifications and improvements of this invention will occur to those skilled in the art upon reading the foregoing. It should be understood that all such modifications and improvements have been deleted herein for the sake of conciseness and readability, but are properly within the scope of the following claims.

We claim:

1. A system for monitoring operating conditions within a nuclear reactor comprising means for measuring a plurality of operating parameters within the nuclear reactor, including the position of axial power shaping rods and regulating control rod, means for determining from said operating parameters the operating limits before a power peaking condition exists within the nuclear reactor, means for displaying said operating limits comprising a visual display permitting the continuous monitoring of the operating conditions within the nuclear reactor as a graph of said shaping rod position vs said regulating rod position having a permissible area and a restricted area with said permissible area being further divided into a recommended operating area for steady state operation and cursor means located on the graph to indicate the present operating condition of said nuclear reactor to allow an operator to view any need for corrective action based on the movement of said cursor means out of said recommended operating area and to take any corrective transient action within said permissible area.

2. The system as defined in claim 1 further including means for measuring the amount of output power being produced by the nuclear reactor, said output power amount being utilized by said determining means to adjust said operating limits in response to changes in the output power of the nuclear reactor.

3. The system as defined in claim 1 further including cursor means for indicating the present operating conditions of the nuclear reactor on said visual display.

4. The system as defined in claim 1 further including memory means for the storage of pixel sets utilized to visually define said operating limits on said visual display.

* * * * *